United States Patent [19]

Gubler

[11] Patent Number: 5,446,974
[45] Date of Patent: Sep. 5, 1995

[54] COMPACT FLEXIBLE FILTER ASSEMBLY FOR A FLUID BED GRANULATOR, COATER AND DRYER

[76] Inventor: Scott A. Gubler, 1414 E. 3850 S., St. George, Utah 84770

[21] Appl. No.: 126,303

[22] Filed: Sep. 23, 1993

[51] Int. Cl.[6] ............................................. F26B 21/06
[52] U.S. Cl. ............................................. 34/82; 34/80; 55/304
[58] Field of Search ................ 34/80, 82; 55/302–304, 55/305

[56] References Cited

U.S. PATENT DOCUMENTS

| | | | |
|---|---|---|---|
| 4,046,526 | 1/1976 | Phillippi | 55/96 |
| 4,218,227 | 3/1979 | Frey | 55/302 |
| 4,322,231 | 6/1980 | Hilzendeger | 55/357 |
| 4,331,459 | 10/1980 | Copley | 55/302 |
| 4,345,922 | 12/1980 | Grassel | 55/302 |
| 4,395,269 | 9/1981 | Schuler | 55/302 |
| 4,670,993 | 6/1987 | Dunaway et al. | 34/82 X |
| 4,861,353 | 12/1987 | Wyss | 55/96 |
| 4,953,308 | 9/1990 | Basten | 34/82 |
| 5,017,200 | 9/1990 | Price | 55/96 |
| 5,115,578 | 5/1992 | Basten | 34/57 |
| 5,251,384 | 10/1993 | Olsen et al. | 34/82 |

*Primary Examiner*—Henry A. Bennet

[57] ABSTRACT

A novel filter assembly (8) for fluid bed granulator, dryer or coater machines (1) which utilize a rigid filter frame (10) consisting of a solid bottom plate (4), a donut shaped top plate (3) with said top and bottom plates being connected by side rods (5) to form a cage like frame work. Said rigid filter frame (10) is reusable, around which a pleated (13) reusable flexible filter bag (9) is fitted and clamped (7), top support plate (2) and mounting plate (12) are connected by a threaded rod (6) with a sealing gasket (11) between them. Said filter assembly (8) is located inside said fluid bed machine's exhaust path so that when the process air is drawn through the filter bag (9) it forms around and through the filter frame (10) to cause a pleated (13) accordion effect in such a way that it allows the use of flexible filter media in a configuration that takes less space, gives better support to prevent tearing, is much easier to change and clean between product production run and can be continuously cleaned during operation by alternately providing reverse air flow through them.

3 Claims, 3 Drawing Sheets

COMPACT FLEXIBLE FILTER ASSEMBLY FOR A FLUID BED GRANULATOR, COATER AND DRYER

BACKGROUND OF INVENTION

Field of Invention

This invention relates in general to fluid bed granulators, coaters and dryers, in particular, to a filter assembly consisting of a rigid filter frame around which a flexible filter media is employed in such a way that it allows the flexible filter media to be used in a much more versatile, simplified and condensed configuration. The invention can also be cleaned of blinding process material during operation by a system in which air pressure is applied alternately to the filters in reverse direction so as to remove the blinding particles from them without periodically stopping the process.

Description of Prior Art

Prior art fluid bed granulators, coaters and dryers have used bag filters, for their filter systems, that are very elaborate in construction, occupy a lot of space in the equipment, are very difficult to change and expensive to replace. The degree of difficulty in changing the filter in a fluid bed system is critical in that the filters have to be changed often to keep the necessary sanitary condition and/or product integrity.

Because of the above described difficulties with the prior art bag filter assemblies, parties have tried to use rigid cartridge filter assemblies such as are used in dust collection bag house etc. The prior art rigid cartridge filters usefulness is greatly limited in that they are made of stiff filter media which is not as versatile as the flexible filter media and can't be used with most of the products and procedures in fluid bed processes. One of the major reason for this limiting factor is that the stiff filter media is too much of a moisture barrier which cause the filters to blind much faster.

Another type of filter assembly that has been employed is the construction of a rigid frame with a flexible media stretched tightly over it. This type of assembly has disadvantages, such as, numerous long filter units are required to get the needed filter area, which cause them to be too bulky, difficult to install, difficult to clean and change.

OBJECTS AND ADVANTAGES

Accordingly, besides the objects and advantages described above, several objects and advantages of the present invention are:

(a) to provide a filter assembly using flexible filter media that is much more compact, without reducing filter media surface area, which has not been available with any prior art.

(b) to provide a filter assembly in which the frame that supports the filter is reusable, and where the filter media construction is simpler and less expensive to construct than the prior art.

(c) to provide a filter assembly that greatly increases the ease of changing and cleaning. The prior art bag systems can take several hours to change wherein this assembly can be changed in minutes.

It is the feature of the present invention that it provides an assembly comprising of a rigid frame work around which flexible filter media is fitted which is mounted in the exhaust system of a fluid bed granulator, coater or dryer. Said filter elements are mounted so that when negative process air is exerted against them during operation said flexible filter media forms around and through the rigid filter framework to give an accordion effect and provide sufficient filter area in a minable space. No prior art has been able to combine these two features of flexible filter media in a simple condensed configuration. Some of the advantages over the prior art bag filters are that this new filter assembly takes less space, and can be cleaned by a periodic pulse jet back flow cleaning device and is much easier to change. Also, the prior art bag filter assemblies are so big and have so much pressure across them with minable support that it can cause rips in the filter media and cause a large amount of product to be lost in seconds. The filter assembly herein being patented prevents this risk in that it has sufficient support to not allow rips in the filter media. Prior art bag systems are elaborate in their design, which make them expensive, difficult to change and clean.

Some of the advantages of this new filter assembly over the prior art rigid cartridge filters are that this assembly allows the use of flexible filter media, which is more versatile, less expensive, and easier to clean. The prior art cartridge assemblies are very difficult to clean when changing from one product to another. The assembly herein being patented requires that the flexible filter media be removed from the frame and washed in a washing machine to clean it before reusing. Prior art cartridge assemblies are made of rigid filter media which does not function properly with many products and procedures, mainly because they blind prematurely.

An element of the rigid frame and flexible filter media assembly, herein being patented, is that when a pulse of reverse air flow is applied against the flexible filter media it causes said media to flex in the opposite direction discharging the blinding particles off the outer fabric. This can be done without stopping the process.

It is an object of the present invention to provide an improved filter assembly for fluid bed granulators, coaters and dryers.

Other objects and features are readily apparent from the following description of certain preferred embodiments thereof taken in conjunction with the accompanying drawings although variations and modifications may be affected without departing from the sphere and the scope of the normal concepts of the disclosed invention. You will find further objects and advantages of the invention from a consideration of the ensuing descriptions and accompanying drawings.

DRAWING FIGURES

DRAWING REFERENCE NUMERALS

1 Fluid Bed Granulator, Coater or Dryer
2 Top Support Plate
3 Filter Top Plate
4 Filter Bottom Plate
5 Side Rod
6 Threaded Rod
7 Filter Clamp
8 Filter Assembly
9 Filter Bag
10 Filter Frame
11 Gasket
12 Mounting Plate
13 Pleat in Bag

DESCRIPTION OF INVENTION

Figure 1:
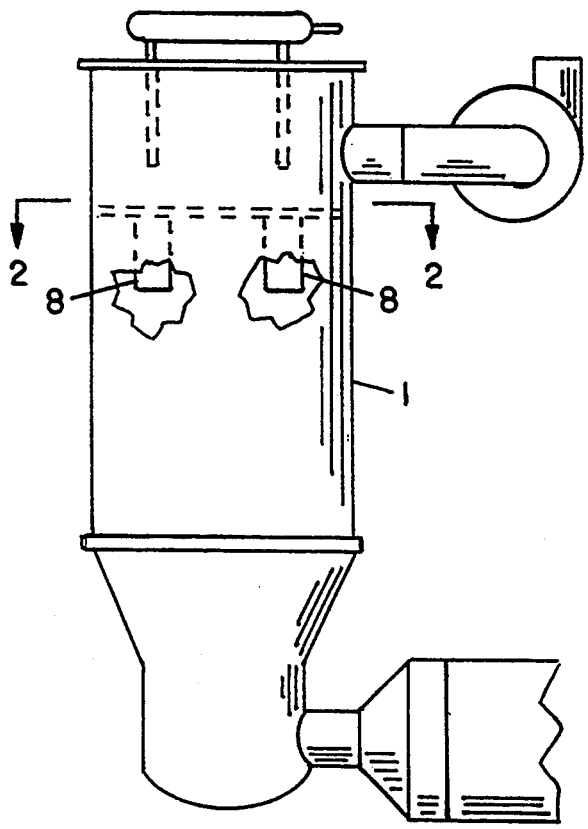
FIG. 1 shows the filter assembly located in the inside area of the fluid bed granulator, coater or dryer.
Figure 2:
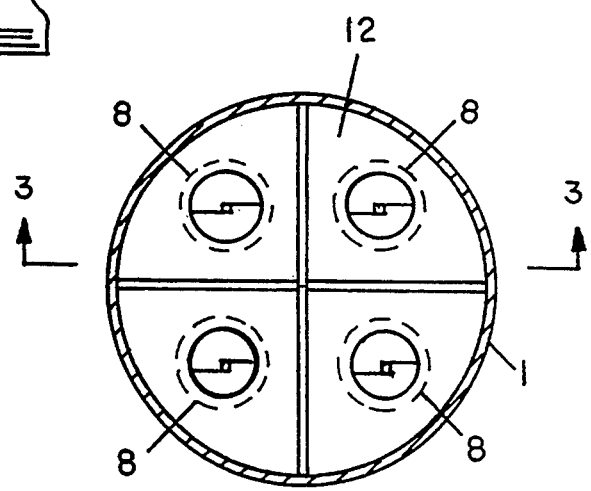
FIG. 2 shows the filter configuration with a combination of filter assemblies taken along the line 2—2 FIG. 1.

FIG. 1 shows the filter assembly 8 located in the fluid bed granulator, coater or dryer.

Figure 3:
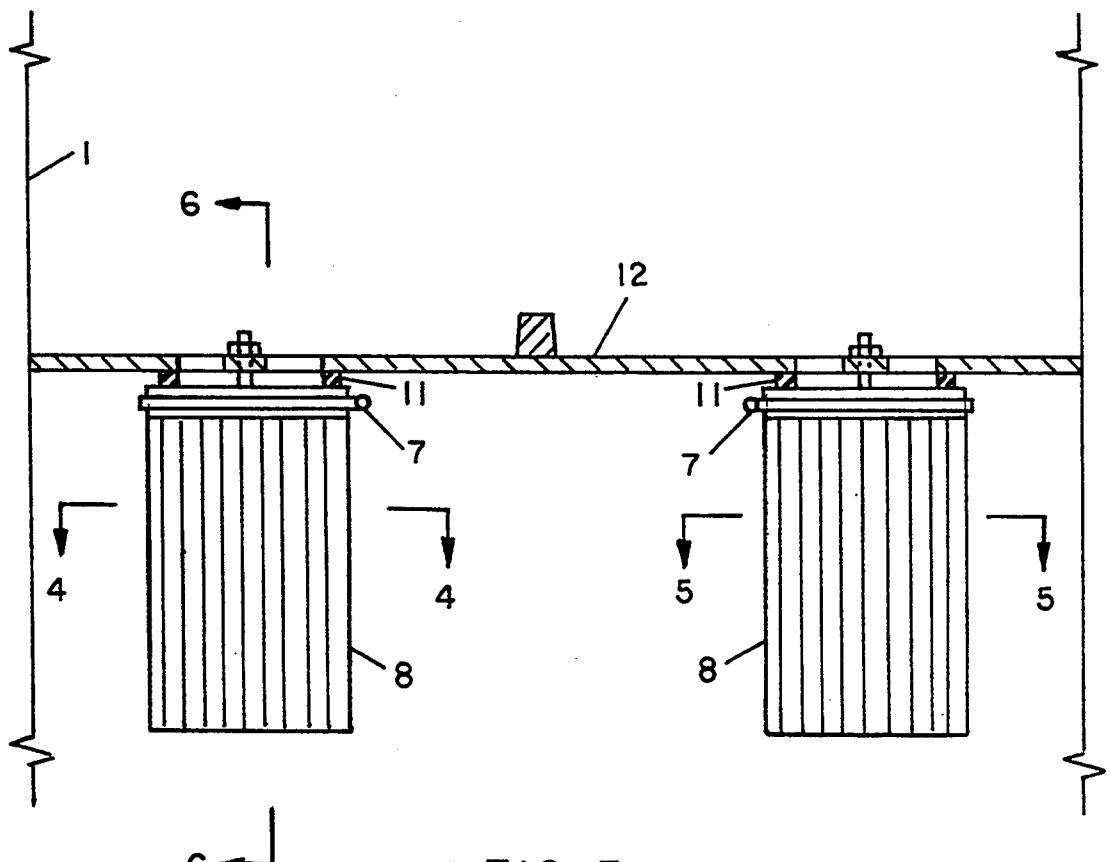
FIG. 3 shows a side view of the filter configuration attached to the mounting plate with a gasket mounted between the filter assembly and mounting plate taken along the line 3—3 FIG. 2.
Figure 4:
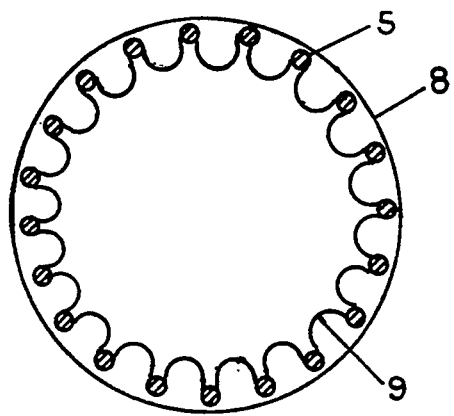
FIG. 4 shows a top sectional view of the filter assembly with the filter bag being pulled, by process air, to the inside area around the side rods, giving it an accordion effect in the process stage of the fluid bed granulator, coater or dryer taken along the line 4—4 FIG. 3.
Figure 5:
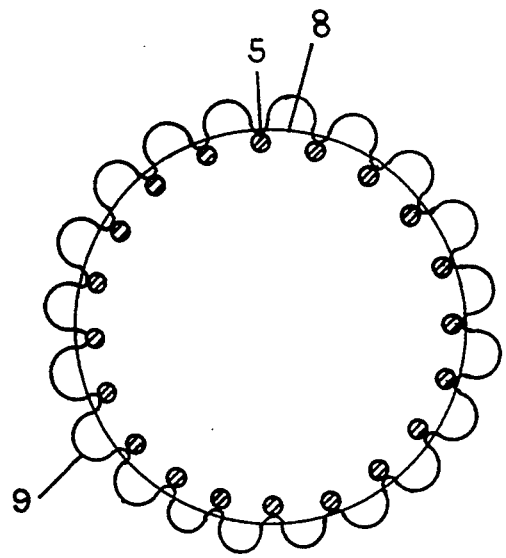
FIG. 5 shows a top sectional view of the filter assembly with the filter bag being pushed out from the side rods by a pulse of reverse air in the cleaning stage of the fluid bed granulator, coater or dryer, taken along the line 5—5 FIG. 3.
Figure 6:
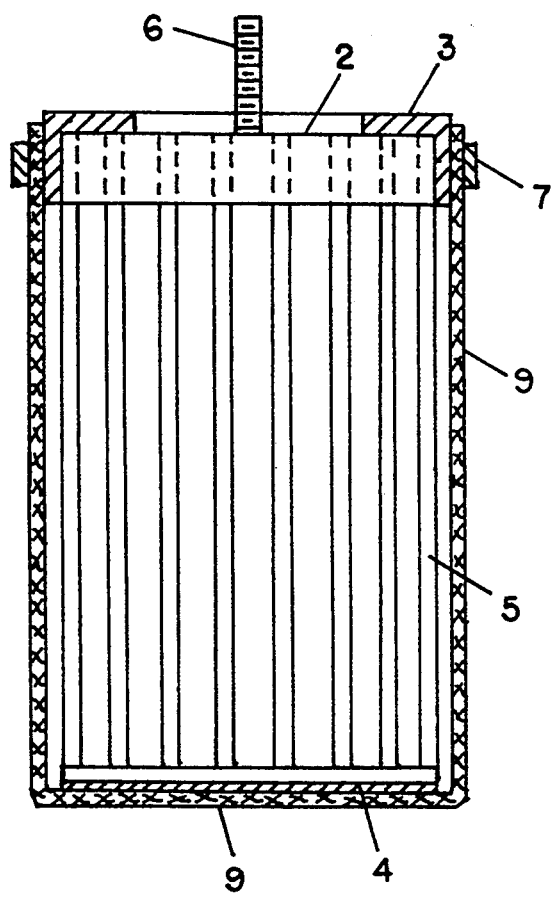
FIG. 6 shows a side sectional view of the filter assembly with the filter frame configuration with a top and bottom connected by side rods which allows the filter bag to fit around the outside of the filter frame as well as over the bottom with a clamp at the top to hold the filter bag in place taken along the line 6—6 FIG. 3.
Figure 7:
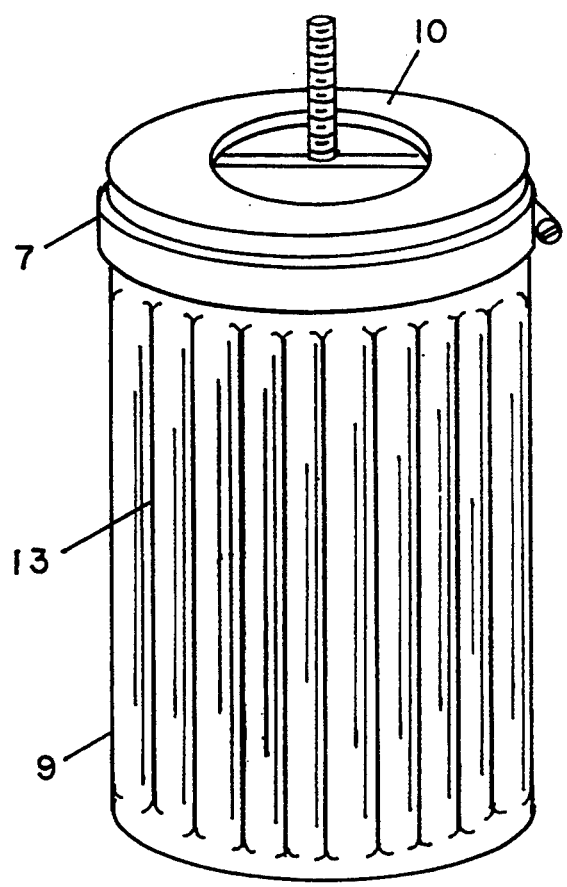
FIG. 7 shows a perspective view of a filter assembly in accordance with the invention.

The filter assembly 8, FIG. 2, FIG. 3, FIG. 4 and FIG. 5, comprises of a filter frame 10, FIG. 7, a filter bag 9, FIG. 4, FIG. 5, FIG. 6 and FIG. 7, a clamp 7, FIG. 3, FIG. 6 and FIG. 7 and a gasket 11, FIG. 3. The filter frame 10, FIG. 7, is a fabricated assembly which comprises of a top support plate 2, FIG. 6 which holds the threaded rod 6, FIG. 6 allowing the filter frame 10, FIG. 7 to be bolted to the mounting plate 12, FIG. 3, a filter top 3, FIG. 6 giving the top of the filter a means of support for the filter top 2, FIG. 6 and filter frame side rod 5, FIG. 4, FIG. 5 and FIG. 6, the top plate has an opening to allow air to flow through the filter, a filter bottom 4, FIG. 6, which allows support for the filter frame rods 5, FIG. 4, FIG. 5 and FIG. 6. The filter frame side rods 5, FIG. 4, FIG. 5 and FIG. 6 are arranged on the perimeter of the top plate 3, FIG. 6 and on the perimeter of the bottom plate 4, FIG. 6, allowing the side rods 5 to form the shape of the side wall of said filter frame assembly 10, FIG. 7. The filter bottom plate 4, FIG. 6 acting as a solid bottom. The filter bag 9, FIG. 4, FIG. 5, FIG. 6 and FIG. 7, having an open top allowing the filter bag 9 during installation, to be pulled upward over the filter frame 10 until the bottom media of the filter bag 9 is tight against the filter bottom plate 4. Clamp 7, FIG. 3, FIG. 6 and FIG. 7, holds the filter bag 9 in place at the top of the filter assembly 8, FIG. 3, FIG. 6 and FIG. 7. Clamp 7, FIG. 3, FIG. 6 and FIG. 7, has a mechanical means of being tightened around the perimeter of the filter assembly 8 and filter bag 9 causing the filter bag 9 to be held in a fixed position at the top of the filter assembly 8, FIG. 3, FIG. 6 and FIG. 7. The filter bag 9 has numerous pleats 13, FIG. 7, to allow the filter bag 9 to expand in the cleaning process and contract on the normal operation as shown in FIG. 4 and FIG. 5. The filter frame 10 is made of a ridged material such as different plastics, metals, hard rubber and wood, the filter frame will vary in size and shape to fit the required filtering applications.

OPERATION OF INVENTION

The filter assembly 8, FIG. 3, herein being patented is located in a fluid bed granulator, coater or dryer 1 in such a way to not allow process material to escape from the process bowl as process fluidation air is passing through it. As the process airflow moves through the filter assembly 8 it causes the filter bag 9 flexible media to draw towards the center of the filter assembly 8, as shown in FIG. 4, causing the filter bag 9 flexible media to collapse allowing the filter bag 9 flexible media to be of sufficient area permitting the necessary process air to pass through at a necessary flow rate causing the proper filtering of the process air. The filter assembly 8 has the ability to clean itself of the filter blinding process material by applying a pulse of reverse air to the outlet side of each filter bag 9 alternating manner which allows the filter bag 9 to flex in the outward direction from the center of the assembly frame 10, which is triggered by an automatic periodic timing device, causing the filter bag 9 to expand quickly. When the filter bag 9 flexes outward as shown in FIG. 5, it allows the filter blinding process material to keep moving in the outward direction away from the filter bag 9 flexible media. This action permits the filter bag 9 to clean itself of sufficient blinding process material without stopping the process. After the pulse of reverse air, the filter media is drawn toward the center of the filter assembly 8 by the process air, once again allowing the filter assembly 8 to filter the necessary process air. When the airflow is turned off the filter assembly 8 can be removed quickly from the fluid bed granulator, coater or dryer 1 by loosening the nut on the threaded rod 6. Now the filter bag 9 can be removed from the filter frame 10 by loosening the clamp 7 permitting the filter bag 9 to be cleaned in a washing machine. When the filter bag 9 flexible media is dry it can be easily mounted again on the filter frame 10 and by tightening the clamp 7 over the outside perimeter of the filter bag 9 and filter frame 10 securing the filter bag 9 to the filter frame 10, FIG. 7. The filter assembly 8 can now be placed in the fluid bed granulator, coater or dryer 1, FIG. 1. The filter assembly 8 is ready to filter the process airflow of the fluid bed granulator, coater or dryer 1.

CONCLUSION AND SCOPE OF INVENTION

Accordingly, the reader will see that the compact flexible filter assembly for a fluid bed granulator, coater or dryer of this invention has the ability to filter sufficient amounts of the processed material from the airflow which moves through the filter assembly. The filter assembly has the ability to clean itself of the filter processed material, when a pulse of reverse airflow is applied to the filter bag, causing the filter bag to flex outward from the center of the filter assembly. This action can be completed during operation without stopping the process. Once the filter bag has cleaned itself the process air resumes to flow from the outside to the inside of the filter assembly again filtering sufficient amounts of the process material from the airflow. Furthermore, the filter assembly has the additional advantages in that it provides the same filtering capacity as bulky prior art filters by allowing the flexible filter media to flex around the side rods of the rigid filter frame causing extended filtering surface;

it permits the process of cleaning with a pulse of reverse air at any time during the operation of the fluid bed granulator, coater or dryer;

it permits quick filter assembly removal from the fluid bed granulator, coater or dryer;

it allows the filter bag to be removed from the rigid filter frame for cleaning in a washing machine;

it allows the filter bag flexible media to be reusable after washing;

it provides compactness allowing the filter assembly to be a smaller configuration.

Although the description above contains many specificities, these should not be construed as limiting the scope of the invention but merely providing illustrations of some of the presently preferred embodiments of this invention. For example, the filter assembly rigid frame and filter bag can have other shapes such as square, oval trapezoidal, triangular, etc.; the top plate, top support plate, side rods, bottom plate, threaded rod can have other shapes and other material.

Thus, the scope of the invention should be determined by the appended claims and their legal equivalents, rather than by the examples given.

I claim as my invention:

1. A filter assembly for a fluid bed granulator, coater, or dryer comprising in combination: a rigid frame, a flexible filter media, a fastening device means to attach said rigid frame to a support structure in said fluid bed granulator, coater, or dryer, a mechanism means to secure said flexible filter media to the rigid filter frame; said rigid frame having a housing framework and numerous opening means sufficient to allow the loose fitting flexible filter media, during the process operation, to form around said rigid frame giving said flexible filter media a pleaded accordion type configuration by process air pressuring means for said flexible filter media against said rigid frame, said flexible filter media being in such a shape means that it covers all opening on said rigid frame means to require all the process air to pass through said flexible filter media before it passes through said rigid frame and an outlet opening, said flexible filter media means to allow the necessary process air to pass through the filter at a flow rate that allows the fluid bed machine to operate properly and having the appropriate porosity means as to filter sufficient amounts of the process material out of the process air, said rigid frame that is covered by said flexible filter media has a sufficient opening on the outlet side of said filter assembly means so as to allow the use of a cleaning procedure, said cleaning procedure means intermediate to the outlet opening means for removing particulate matter accumulated on said flexible filter media, whereby, said filter assembly allows an increased amount of said flexible filter media to be used in a given space within said fluid bed machine and removal of process material from said flexible filter media by said cleaning procedure.

2. The filter assembly for a fluid bed granulator, coater, or dryer according to claim 1 wherein said rigid frame is reusable and said flexible filter media is attached by a clamping device that when unclamped said flexible filter media can be separated from said rigid frame and cleaned or replaced.

3. The filter assembly for a fluid bed granulator, coater, or dryer according to claim 1 wherein a sealing media is located between said rigid frame and said support structure means to prevent process material from bypass of said filter assembly as it exhaust out of said fluid bed machine.

* * * * *